United States Patent
Kennett et al.

(10) Patent No.: US 12,495,928 B2
(45) Date of Patent: Dec. 16, 2025

(54) BARBECUE ARRANGEMENT

(71) Applicant: GAS SERVICES AUSTRALIA PTY LTD, Hendon (AU)

(72) Inventors: Craig Kennett, Hendon (AU); Vince Monsigneur, Hendon (AU)

(73) Assignee: Gas Services Australia Pty Ltd., Hendon (AU)

( * ) Notice: Subject to any disclaimer, the term of this patent is extended or adjusted under 35 U.S.C. 154(b) by 411 days.

(21) Appl. No.: 18/007,196

(22) PCT Filed: Jul. 30, 2021

(86) PCT No.: PCT/AU2021/050834
§ 371 (c)(1),
(2) Date: Jan. 27, 2023

(87) PCT Pub. No.: WO2022/020905
PCT Pub. Date: Feb. 3, 2022

(65) Prior Publication Data
US 2023/0233022 A1 Jul. 27, 2023

(30) Foreign Application Priority Data
Jul. 30, 2020 (AU) ................. 2020902676

(51) Int. Cl.
| | | |
|---|---|---|
| A47J 37/07 | (2006.01) |
| F23N 5/12 | (2006.01) |
| F23N 5/14 | (2006.01) |
| F23N 5/20 | (2006.01) |
| F23N 5/24 | (2006.01) |

(52) U.S. Cl.
CPC .......... A47J 37/0713 (2013.01); F23N 5/123 (2013.01); F23N 5/143 (2013.01); F23N 5/203 (2013.01); F23N 5/242 (2013.01); *A47J 37/0763* (2013.01); *F23N 2225/08* (2020.01); *F23N 2239/04* (2020.01)

(58) Field of Classification Search
CPC ......... A47J 37/0713; F23N 5/123; F23N 5/12
See application file for complete search history.

(56) References Cited

U.S. PATENT DOCUMENTS

| | | |
|---|---|---|
| 5,033,449 A | 7/1991 | Hanagan |
| 5,094,259 A * | 3/1992 | Hsu .................. F23N 5/123 |
| | | 137/66 |
| 6,133,554 A | 10/2000 | Clifford |
| (Continued) | | |

FOREIGN PATENT DOCUMENTS

WO     2021142159     7/2021

*Primary Examiner* — Jorge A Pereiro
(74) *Attorney, Agent, or Firm* — Sand, Sebolt & Wernow Co., LPA

(57) ABSTRACT

A barbecue arrangement comprising a barbecue body having a cooking volume, one or more burners positioned to provide heat to the cooking volume; a gas source adapted to supply a gas to the one or more burners, and one or more control means to control the flow of gas from the gas source to the one or more burners producing a flame when the gas is ignited; a flame detection assembly, the flame detection assembly adapted to sense the flame from the one or more burners and a control means adapted to shut off the gas flow to the one or more burners if the flame is not detected within a pre-determined period of time.

8 Claims, 6 Drawing Sheets

(56) References Cited

U.S. PATENT DOCUMENTS

| | | | |
|---|---|---|---|
| 6,322,352 B1* | 11/2001 | Zink | F23N 5/123 |
| | | | 431/82 |
| 2008/0124667 A1 | 5/2008 | Schultz | |
| 2014/0212821 A1* | 7/2014 | Banu | F24C 3/103 |
| | | | 431/77 |
| 2015/0075516 A1 | 3/2015 | Inada et al. | |
| 2015/0150404 A1 | 6/2015 | Albizuri Landazabal et al. | |
| 2016/0353929 A1 | 12/2016 | Mclemore et al. | |
| 2019/0137108 A1* | 5/2019 | Querejeta Andueza | |
| | | | F23N 1/005 |
| 2021/0215344 A1* | 7/2021 | Eckhardt | F23N 5/123 |

* cited by examiner

BARBECUE ARRANGEMENT

FIELD OF THE INVENTION

The invention relates to a barbecue arrangement and in particular, a barbecue arrangement including a flame safety assembly.

BACKGROUND OF THE INVENTION

A barbecue appliance, also known as a barbecue grill, is a device that cooks food by applying heat from below. There are several varieties of barbecues including, but not limited to, gas fuelled, charcoal, or electric barbecues. Gas fuelled barbecues are particularly popular and are typically fuelled with propane or butane (liquefied petroleum gas) or natural gas. Gas barbecues are available in a range of sizes, from small to medium sized portable barbecues or larger or industrial sized in-built barbecues. Due to their versatility and accessibility, gas barbecues are very popular and in common use all over the world.

However, there are several safety issues relating to the use of gas fuelled barbecues. Gas barbecues are regularly responsible for fires, injuries, and damage to property. Approximately 30% of all gas safety incidents are caused by gas fuelled barbecues. The higher risk usage areas for gas barbecues include high-rise apartments, marine craft, and caravans; however, gas barbecue related incidents can also occur in other areas including houses, commercial premises, and public outdoor areas.

Another common problem, particularly when a barbecue is covered by a grill hood (or lid or cover), is that the user is unaware and/or unable to easily identify when the flame has been extinguished. This can result in several issues including, food not being cooked properly and also risks associated with gas being supplied and allowed to build up in the absence of a flame.

Accordingly, there is a need for a safer gas barbecue arrangement.

OBJECT OF THE INVENTION

It is an object of the invention to overcome, or at least substantially ameliorate, the disadvantages and shortcomings of the prior art.

Other objects and advantages of the present invention will become apparent from the following description, taken in connection with the accompanying drawings, wherein, by way of illustration and example, certain embodiments of the present invention are disclosed.

SUMMARY OF THE INVENTION

In one form of the invention there is proposed a barbecue arrangement comprising:
 a barbecue body having a cooking volume, one or more burners positioned to provide heat to the cooking volume;
 a gas source adapted to supply a gas to the one or more burners, and one or more control means to control the flow of gas from the gas source to the one or more burners producing a flame when the gas is ignited;
 a flame detection assembly, the flame detection assembly adapted to sense the flame from the one or more burners;
 a control means adapted to shut off the gas flow to the one or more burners if the flame is not detected within a pre-determined period of time.

In preference the barbecue arrangement further comprises; an ignition system, wherein the control system attempts to ignite the gas flowing to the one or more gas burners when the flame detection assembly has detected no flame and before the control means shuts of the gas flow.

In a further form of the invention, although this should not be seen as limiting in any way, there is a barbecue arrangement, including: a barbecue body having a cooking surface, one or more burners positioned below the cooking surface, and one or more control knobs; a gas source adapted to supply a gas to the one or more burners, wherein the one or more control knobs are adapted to control the supply of the gas from the gas source; a flame safety assembly, the flame safety assembly having a power source; an ignition system, wherein the ignition system includes an on/off button in connection with the power source and an electrode ignition rod, wherein the electrode ignition rod is placed in a path of gas flow from the gas source; a flame sensor arrangement adapted to sense a flame within a flame location within the one or more burners; and a control means including a microcontroller and a valve arrangement, wherein the control means is in communication with the power source, the flame sensor arrangement and the ignition system; and wherein the control means is adapted to cause the valve arrangement to close and prevent supply of the gas when the ignition system is in an on position and no flame is detected.

In preference, the valve arrangement includes one or more solenoid valves, wherein the one or more solenoid valves are open when energised by the power source and the one or more solenoid valves are closed when de-energised.

In preference, the valve arrangement includes a pair of solenoid valves in series.

In preference, the flame sensor arrangement includes a flame sensing rod positioned such that an end portion of the flame sensing rod is positionable within the flame location in the one or more burners where a flame is intended to burn.

In preference, the control means is further adapted to ignite a flame within the flame location when the ignition system is in the on position prior to ceasing supply of the gas flow when no flame is detected in the flame location.

In preference, the control means is adapted to cease supply of the gas flow within one second when no flame is detected.

In preference, the flame safety assembly further includes a housing unit, wherein the housing unit contains the microcontroller, and the valve arrangement of the control means.

In preference, the housing unit may be removably mounted to the barbecue body.

In preference, the barbecue body includes a lower body and a grill hood, wherein the lower body houses the cooking surface and the one or more burners.

In preference, the power source is a rechargeable battery and/or mains electricity.

In preference, the barbecue arrangement further includes a thermoelectric generator connected to the rechargeable battery, which charges the rechargeable battery.

In preference, the thermoelectric generator is removably mounted to the barbecue body.

In preference, the flame safety arrangement further includes a flame rollout cut off switch in communication with the control means, which is adapted to cause the valve arrangement to close and prevent supply of the gas flow when the ignition system is in an on position and a flame is detected outside the barbecue body.

In preference, the flame rollout cut off switch includes a temperature dependent resistor mounted to an outside of the barbecue body, wherein the temperature dependent resistor is adapted to cease a signal to the control means when a flame temperature is reached.

In preference, the on/off button is adapted to illuminate when the ignition system is in the on position.

In preference, the on/off button is adapted to provide an illuminated light in a first colour when the flame is detected.

In preference, the illuminated light is adapted to change to a second colour when no flame is detected.

In preference, the first colour is green, and the second colour is red.

To now describe the invention in greater detail a series of preferred embodiments will be presented with the assistance of the following illustrations and accompanying text.

DESCRIPTION OF THE PREFFERED EMBODIMENTS

Figure 1:
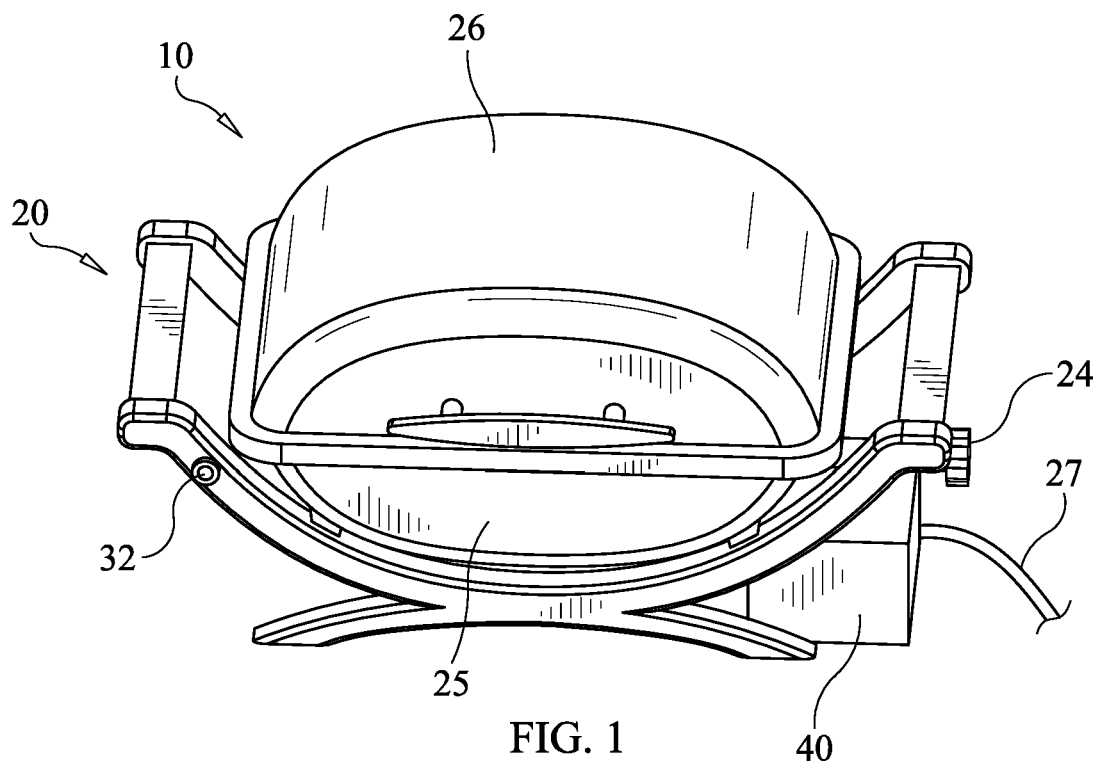
FIG. 1 is a front view of the barbecue arrangement in a preferred embodiment of the invention.
Figure 2:
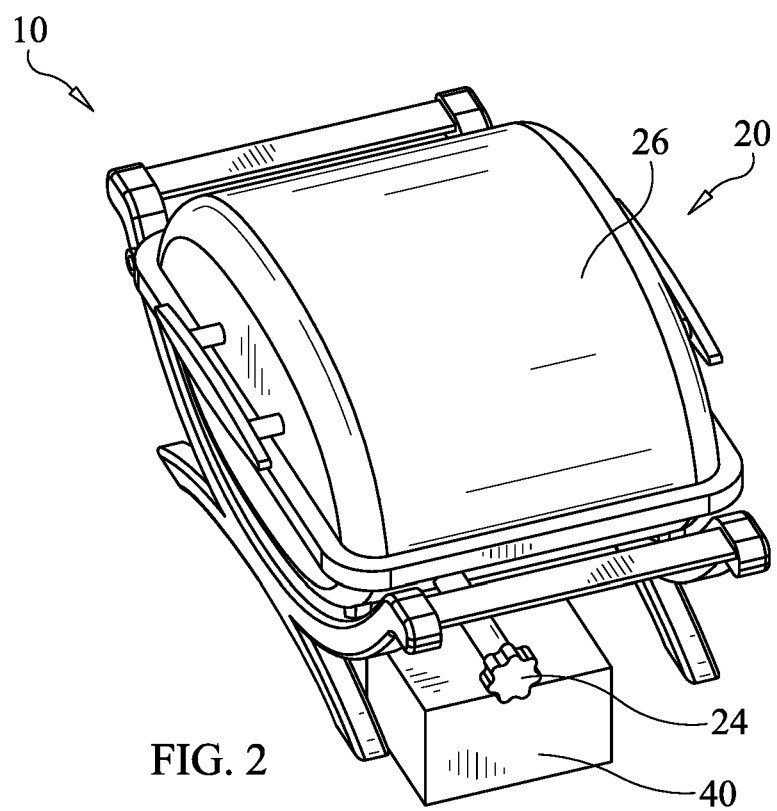
FIG. 2 is a side perspective view of the barbecue arrangement in a preferred embodiment of the invention.
Figure 3:
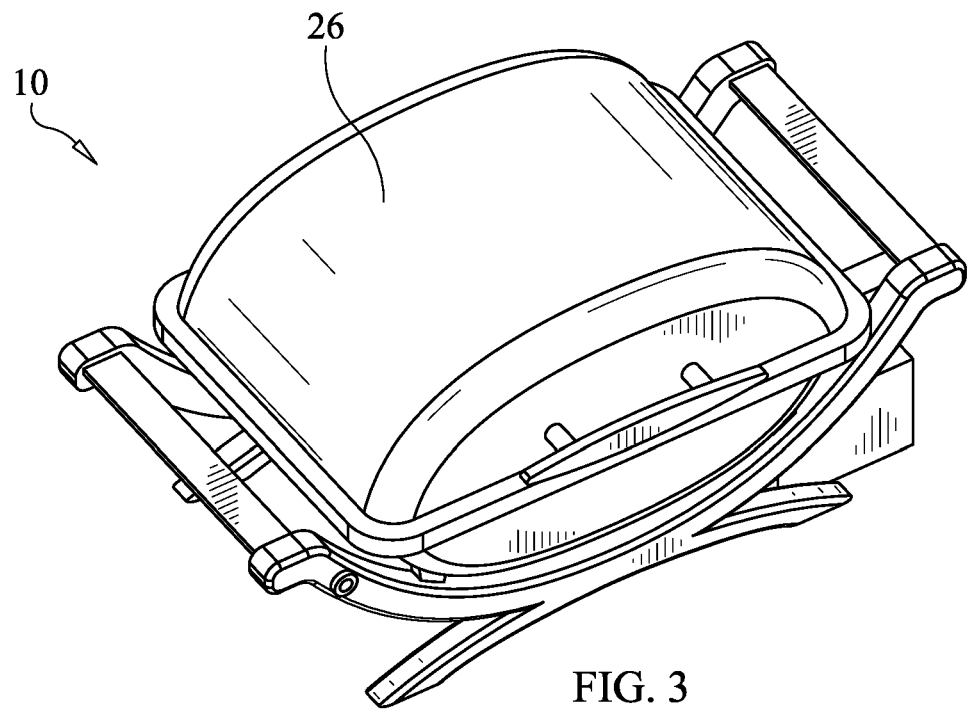
FIG. 3 is another side perspective view of the barbecue arrangement in a preferred embodiment of the invention.
Figure 4:
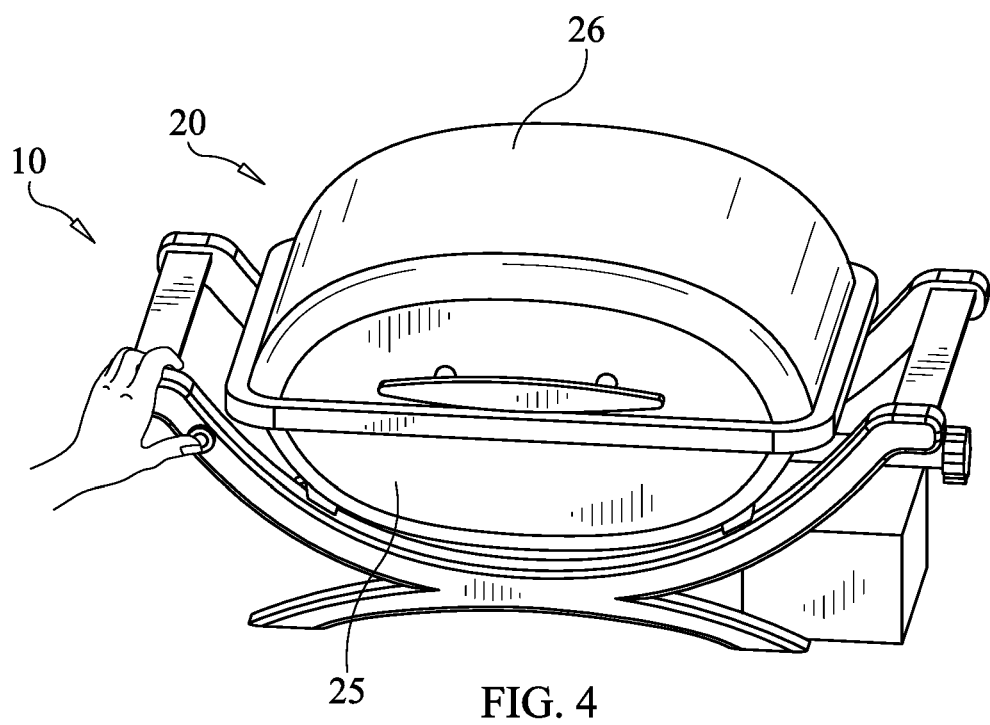
FIG. 4 is another front view of the barbecue arrangement in a preferred embodiment of the invention.
Figure 5:
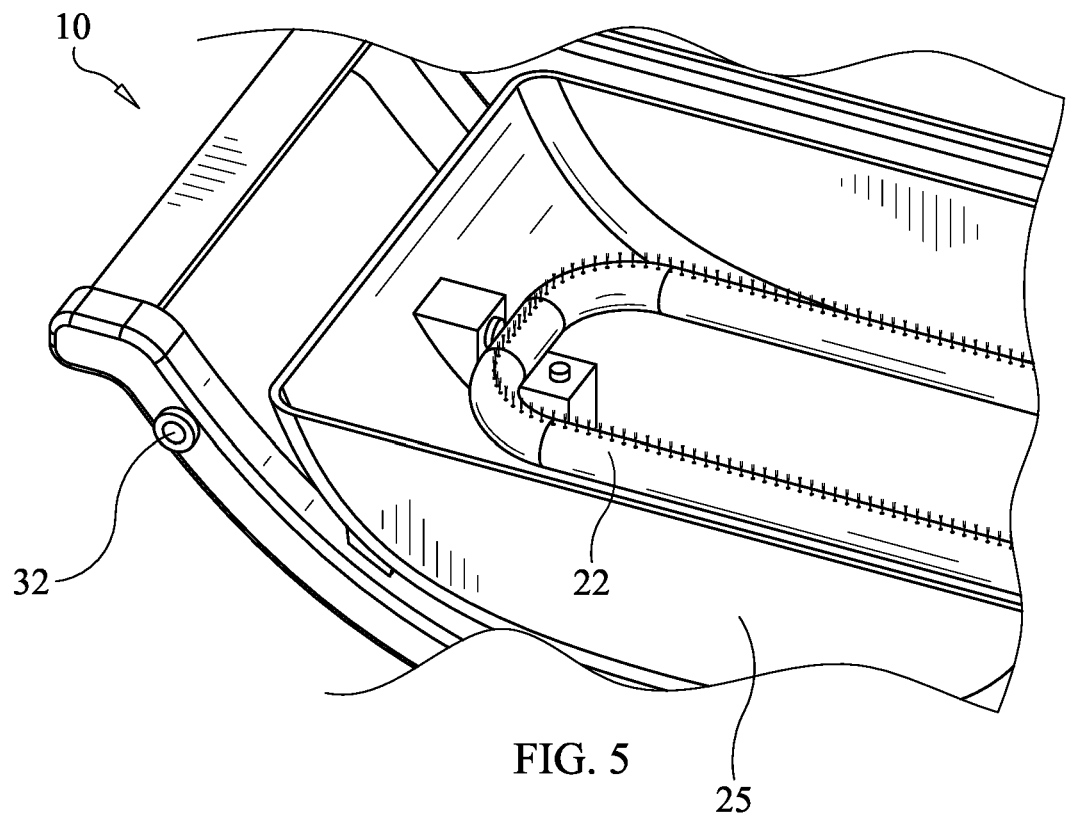
FIG. 5 is a perspective view showing an interior of the barbecue body of the barbecue arrangement in a preferred embodiment of the invention.
Figure 6:
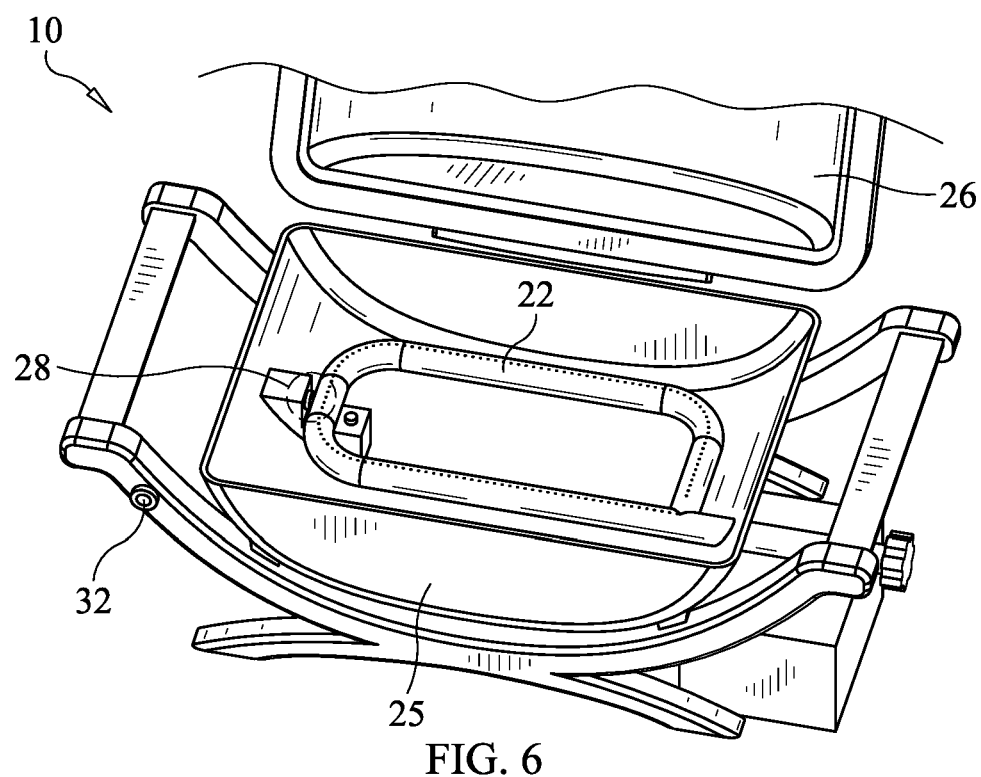
FIG. 6 is another perspective view showing an interior of the barbecue body of the barbecue arrangement in a preferred embodiment of the invention.
Figure 7:
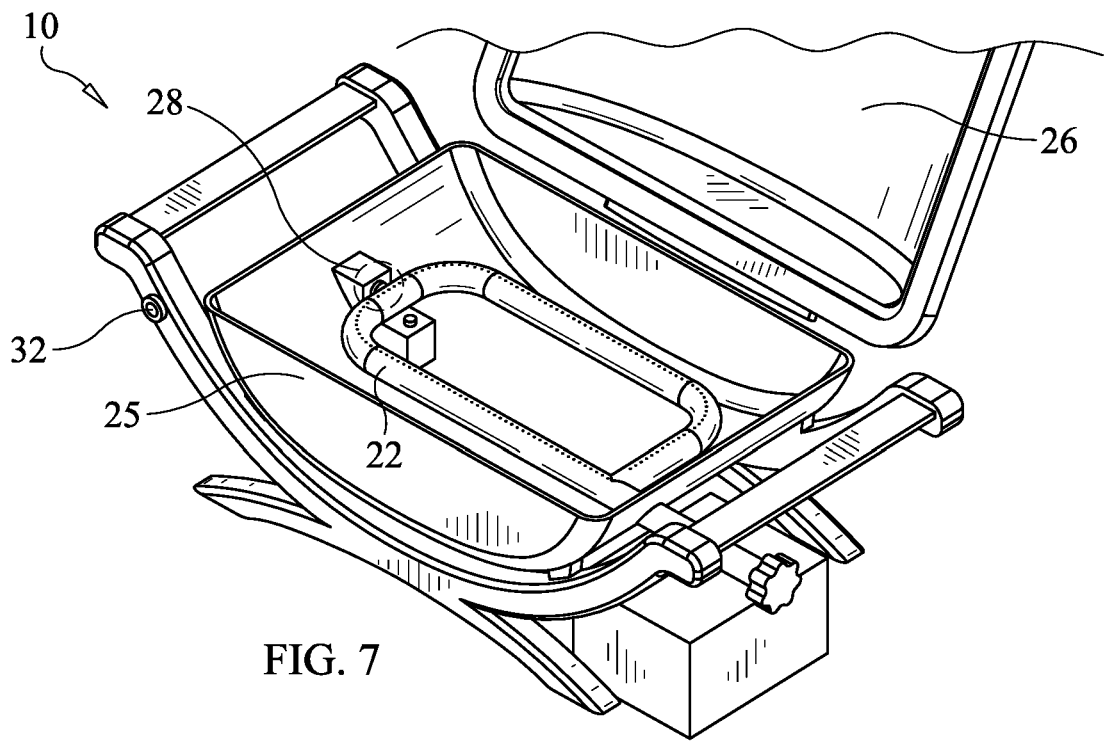
FIG. 7 is another perspective view showing an interior of the barbecue body of the barbecue arrangement in a preferred embodiment of the invention.
Figure 8:
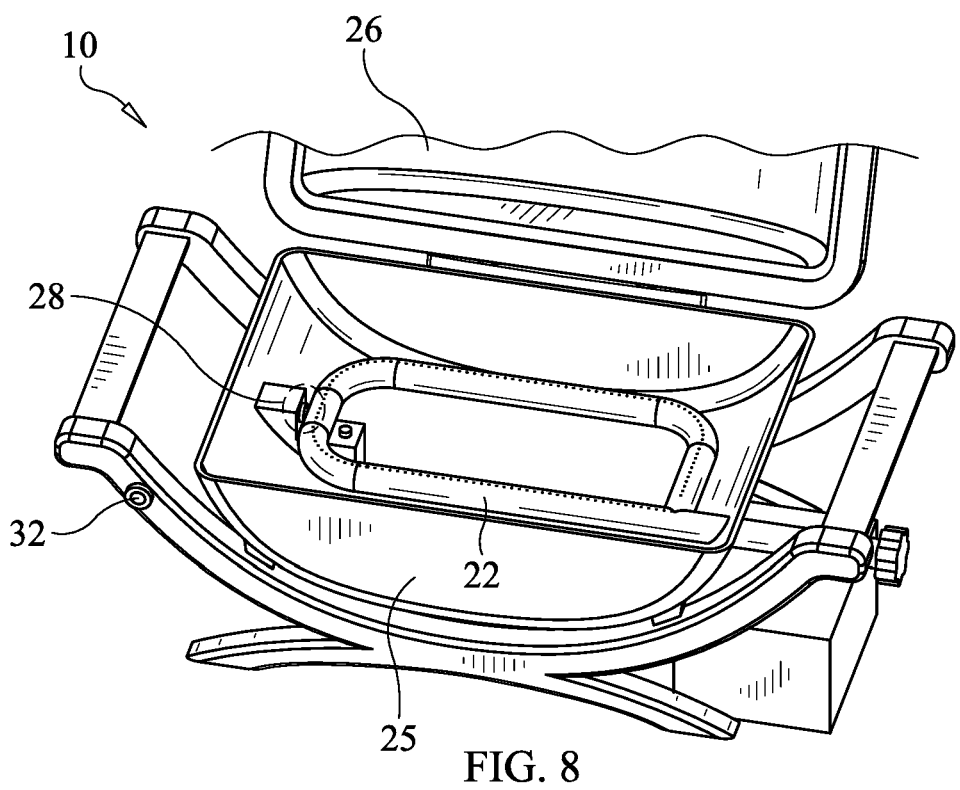
FIG. 8 is another perspective view showing an interior of the barbecue body of the barbecue arrangement in a preferred embodiment of the invention.

While the present invention is open to various modifications and alternative constructions, certain embodiments are shown in the drawings and will be described in detail below. There is no intention to limit the invention to the specific form disclosed but, rather, the invention is to cover all modifications, alternative constructions, and equivalents falling within the spirit and scope of the invention as defined in the claims.

DETAILED DESCRIPTION OF THE INVENTION

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration. The following description will describe several embodiments of the present invention.

Figure 9:
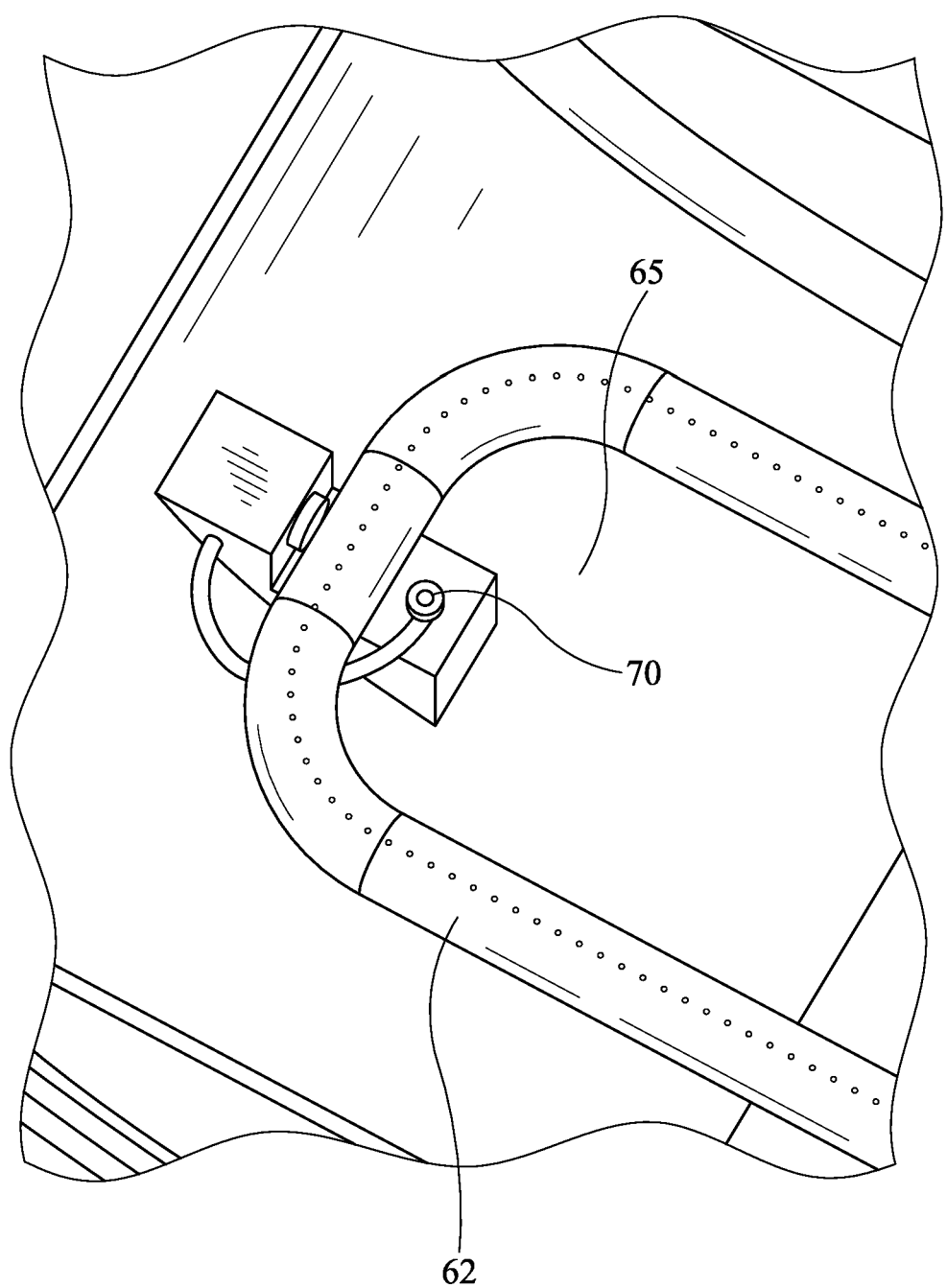
FIG. 9 is a perspective view showing an interior of the barbecue body of the barbecue arrangement incorporating a thermoelectric generator in a preferred embodiment of the invention.
Figure 10:
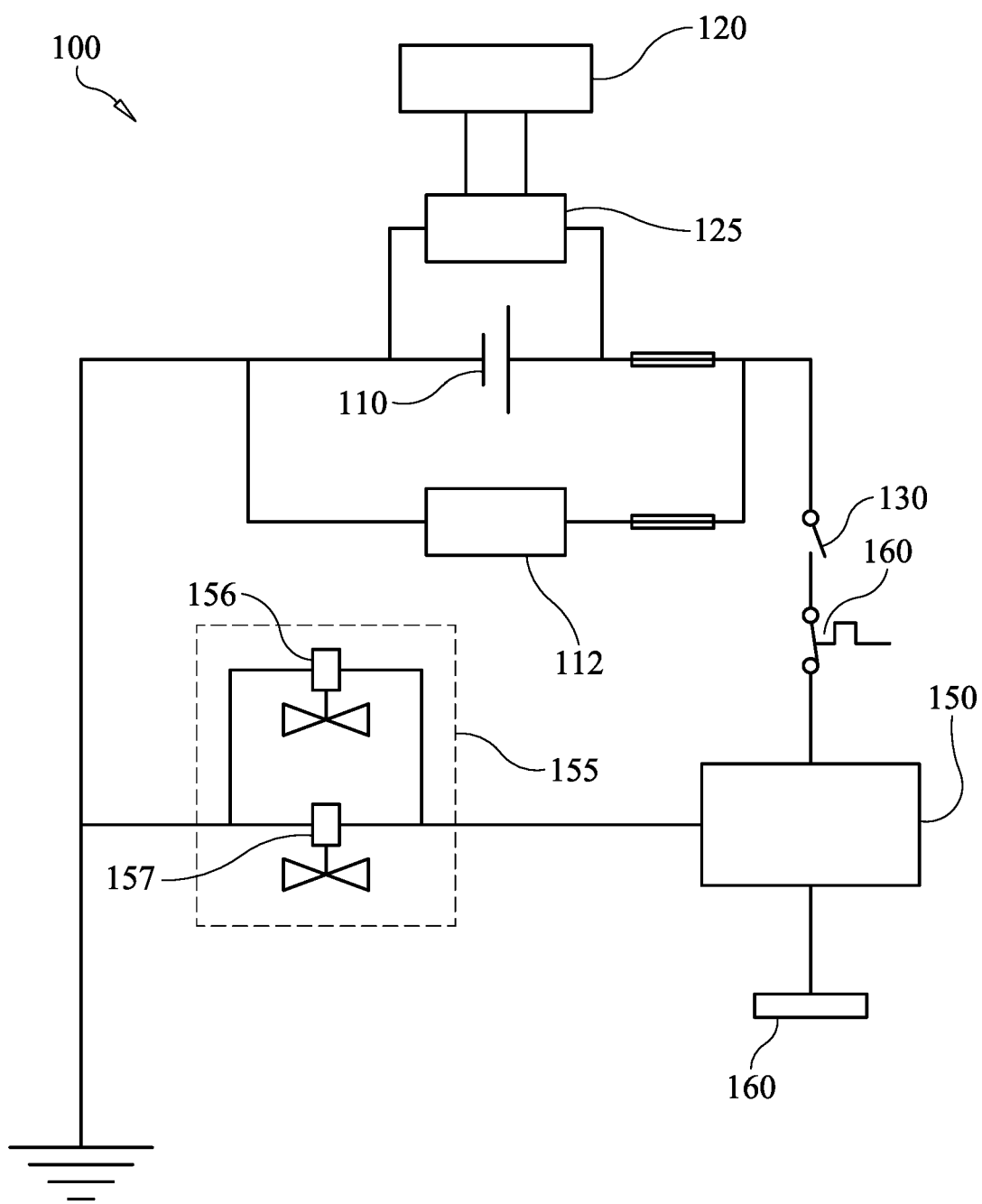
FIG. 10 is an electrical drawing showing an example of a circuit layout of the barbecue arrangement in a preferred embodiment of the invention.

FIGS. 1 to 8 depict a preferred embodiment of the barbecue arrangement (10) of the present invention, whilst FIG. 9 depicts a further preferred embodiment and FIG. 10 is an example of an electrical circuit according to an embodiment of the present invention.

The barbecue arrangement of a preferred embodiment of the invention is shown generally as (10).

The barbecue arrangement (10) includes a barbecue body (20) having a cooking surface (not shown) and a burner (22) positioned below the cooking surface. The cooking surface may include a flat hot plate style or a grill style, or a combination of both, as desired, and may be made of steel, cast iron, or any other suitable material known by those skilled in the field. In the embodiment shown, the barbecue arrangement includes one burner (22); however, any number of burners (22) are possible and fall within the scope of the present application. The barbecue body (20) also includes one control knob (24); however, any number of control knobs (24) may be used as desired. The control knob is not an essential feature though and other ways of controlling the gas flow may be employed.

It is to be understood that instead of a cooking surface, the barbecue may support a cooking chamber, such as may occur where one uses a rotisserie. It may also be used in ovens where the burners are located on the sides or even above the food to be cooked. It is not intended to limit the invention to a barbecue where there are burners under a cooking surface only.

The barbecue arrangement (10) also includes a gas source (not shown), which is adapted to supply natural gas to the burner (or burners) (22), such as by way of a gas hose (27). The control knob (24) is adapted to control the supply of gas from the gas source to the burner (22). In the embodiment shown, the control knob (24) may be rotated by a user to turn the supply of gas on and off as desired. In the embodiment depicted in FIGS. 1 to 8, the barbecue body (20) is made up of a lower body (25) and a grill hood (26), the lower body (25) housing the cooking surface (not shown) and burner (22), whilst the grill hood (26) acts to trap the heat within the barbecue body (20) for cooking. When in use, the grill hood (26) may be positioned in the closed position, as shown in the accompanying drawings, or lifted in the open position, as desired.

The barbecue arrangement may also apply where the gas may be provided in a butane bottle rather than through a hose, the former typically used in camping arrangements.

The barbecue arrangement (10) of the present embodiment also includes a flame safety assembly, which includes a power source (not shown). The power source may include a battery, which allows the barbecue arrangement to be fully portable. For example, the battery may include a Lithium Iron Phosphate (LFP) battery with approximate voltage 12 VDC and a capacity of 5 Ah to 7 Ah. In the present embodiment, the battery is a rechargeable battery, which will be discussed further below. Any other suitable battery may also be used. Alternatively, in other embodiments the power source could include mains power, such as a 10 Amp, 240 volts power supply. In one embodiment, the flame safety assembly may be adapted to indicate any faults associated with the battery and the battery power storage level. The flame assembly may however not require a power source, it may be a mechanical arrangement.

The flame safety assembly further includes an ignition system, which includes an on/off button (32) in connection with the power source and an electrode ignition rod (not shown). According to a preferred embodiment, the on/off button (32) is operable by way of an on/off switch, which in a preferred embodiment is a single pole, single throw switch. The on/off button (32) illuminates by way of a light-emitting diode (LED) when the ignition system is in the on position and is not illuminated when the power is off, and the ignition system is in the off position. According to a preferred embodiment, the on/off button (32) is further adapted to provide a red illuminated light when the flame is out and a green illuminated light when the flame is on. This is advantageous in that the operator will be aware of the status of the flame visually without the need to open the lid. Alternatively, there may be an associated audio warning if the flame is out. Furthermore, other types of indicators many be used to indicate that the flame has gone out, such as a visual screen imparting information to a user.

The ignition system also incorporates a spark generator. During operation, when the on/off button (32) is pressed by a user, the switch is activated to cause electricity from the power source to flow through wires and a spark (or sparks) will be generated between an electrode ignition rod and a ground plate (not shown), wherein the electrode ignition rod is placed in a path of the gas flow causing the burner to ignite for cooking.

In addition, the flame safety assembly of the barbecue arrangement (10) includes a flame sensor arrangement adapted to sense the presence or absence of a flame within a flame location (for example region (28)) within the one or more burners. The flame sensor arrangement can include any type of flame sensor that is suitable for detecting the presence or the lack of presence of a flame. According to one embodiment, the flame sensor arrangement includes a flame sensing rod (not shown) positioned such that an end portion of the flame sensing rod is positionable within the flame location (28) in the one or more burners where a flame is intended to burn (see for example FIGS. 6 to 8). The flame sensing rod operates on the basis that the flame can conduct a current when a potential is applied across it (flame ionization). The advantage of flame sensing rods includes quick response to flame failure, flexibility of positioning, fail safe system, and can withstand high temperatures for a long time. The flame sensing rod is earthed to the gas burner. Thus, when the ignition system is on and the valve arrangement is open, the flame detector monitors the current flow on the flame sensing rod by generating a potential at the flame sensing terminal, which is connected to the sensor with a conductor. When no flame is present there will be potential at the rod and no current, when a flame is present a small DC current will be present as a path is made between the flame rod and the ions in the flame.

Other ways to sense if there is a flame present may include a spectrum detector, a sound detector, or an electronic thermo-electric means. A temperature sensor may also be used to sense if the temperature within the barbecue has decreased if the amount of gas flow has not been reduced.

The flame safety assembly further includes a control means, which is in communication with the flame detector and the ignition system. According to the embodiment depicted, the control means includes a microcontroller and a valve arrangement. The microcontroller contains one or more CPUs along with memory and programmable input/output peripherals and is programmable by methods known by those skilled in the art. The valve arrangement may include one or more solenoid valves used to control the flow of gas from the gas source. In particular, the solenoid valves are in communication with the microcontroller, such that the solenoid valve is open when energized by the power source and the solenoid is closed when de-energised. In particular, the valve arrangement may include a pair of solenoid valves in series, which provides another layer of protection should one valve leak gas. Any other suitable valve arrangement that would be known by the person skilled in the art and meets the required industry standards could also be used. The control means is adapted to respond to the flame detector, such that if the DC current is not detected a signal will be sent to the valve arrangement and the valve or valves will be shut off to cease the supply of gas to the burner. In one form of the invention, the microcontroller of the control means can be programmed to cease the supply of gas within one second of detecting the absence of the flame, which greatly improves the safety of the barbecue in comparison with existing systems. In addition, the control means can be programmed to attempt reignition of the burner several times before shutting the gas supply off.

In the embodiment depicted in FIGS. 1 to 8, the control means resides within a housing unit (40), which is designed to protect the control means and conveniently mount it to the barbecue body (20). The housing unit (40) is shown to be mounted horizontally on a side of the barbecue body (20); however, it can be mounted vertically or horizontally in any suitable position.

In a further embodiment of the present invention, the flame safety arrangement may further include a flame rollout cut off switch, so should, for example, a fat fire ignite, the flame rollout cut off switch will safely stop the fuel supply, reducing the risk of severe damage, injury and spread of the fire. The flame rollout cut off switch includes a temperature dependent resistor mounted to an outside of the barbecue body, wherein the temperature dependent resistor is adapted to cease a signal to the control means when a flame temperature is reached.

In one preferred embodiment of the invention, the power source is a rechargeable battery, which may be charged by connection to a mains power source or by other means. An example of the specifications associated with a suitable battery charger may include an input voltage of approximately 100-240 AC, frequency of 50/60 Hz, power output of 12 VDC, 1 Amp, and capacity of 12 Watt. At the listed battery specifications, the power source should provide unlimited cooking.

FIG. 9 depicts another embodiment of the present invention, whereby the barbecue arrangement further includes, a thermoelectric generator (70), which converts the heat flux resulting from the temperature difference between the hot and cool surfaces within the barbecue arrangement directly into electrical energy, which is then supplied to the rechargeable battery for use in recharging. In particular, the temperature difference across both surfaces of the thermoelectric generator causes electrons to move from the hot surface to the cool surface. As shown, the thermoelectric generator (70) is mounted within the lower body (65) of the barbecue body, such that the temperature difference between the hot surface of the thermoelectric generator (70), which is caused by its close proximity to the burner (62), and the cool surface of the thermoelectric generator (70), which is caused by its close proximity to the cooler lower body (65) of the barbecue arrangement, results in the movement of electrons and subsequent generation of electrical energy. This unique feature allows the barbecue arrangement to perform electronic features and be fully portable with no requirement to change or replace batteries in the medium to long term. The battery will be charged from the heat source of the barbecue arrangement when in use. In extreme circumstances it has the provision to be charged from an external source if required.

FIG. 10 is an example of an electrical drawing depicting the components in a preferred embodiment of the invention. As shown, the barbecue arrangement (100) includes a power source in the form of a battery (110), which is a part of the flame safety assembly, and includes an associated charger port (112). According to a preferred embodiment, the battery (110) is a rechargeable Lithium Iron Phosphate (LFP) battery with approximate voltage 12 VDC and a capacity of 5 Ah to 7 Ah; however, any other suitable rechargeable battery that would be known by those skilled in the art may be used. As shown, in one preferred embodiment, the battery (110) is connected by way of a control module (125) to a thermoelectric generator (120). The thermoelectric generator (120) converts the heat flux resulting from the temperature difference between the hot and cool surfaces within the barbecue arrangement (100) directly into electrical energy, which is then supplied to the battery (110) for use in recharging. In alternative embodiments, the power source may include any other battery or mains power, as desired.

As shown in FIG. 10, the barbecue arrangement (100) also includes the on/off switch (130), which, as mentioned above, forms part of the ignition system to facilitate turning the barbecue arrangement on and off when required. As mentioned above, in a preferred embodiment the on/off switch (130) operated by way of the on/off button is in the form of a single pole, single throw switch. The sensor, which is connected to the switch, provides a dual function of providing the spark when the user engages the on/off switch (130), wherein the spark is generated between an electrode ignition rod and a ground plate (not shown) and the electrode ignition rod is placed in a path of the gas flow causing the burner to ignite for cooking. The sensor arrangement is part of the flame sensor arrangement and includes a flame sensing rod (not shown), which is discussed in more detail above. There is also a microcontroller (150) and valve arrangement (155) containing the solenoid valves (156, 157). The microcontroller (150) is adapted to respond to the sensor (140), such that if the DC current is not detected a signal will be sent to the valve arrangement (155) and the valves (156, 157) will be shut off to cease the supply of gas to the burner.

The flame rollout cut off switch (160) includes a temperature dependent resistor (not shown) mounted to an outside of the barbecue body, wherein the temperature dependent resistor is adapted to cease a signal to the control means when a flame temperature, for example 150° C., is reached.

The microcontroller (150) is programmable to interact and respond to the on/off switch (130), sensor arrangement, valve arrangement (155) and the flame rollout cut off switch (160), as discussed above with respect to FIGS. 1 to 8.

When in use, a user of the barbecue arrangement is required to rotate the one or more control knobs to initiate a supply of gas from the gas source. Following, this the user presses the on-off button of the ignition system, the control means is programmed to then reset and perform a self-check routine in conjunction with the flame detector to verify that no flame exists. If no flame is detected, the control means recognizes that it is safe to start. After the pre-purge delay the valve arrangement is energized to supply gas and sparks commence for the trial for ignition. Again, it is important to note that other control means instead of a control knob may be used.

When the flame detector detects a flame during the trial for ignition, sparking stops and the valve arrangement remains energised. The flame detector and control means constantly monitor the flame to assure that the system continues to operate properly. When the user presses the on/off switch again, it is dis-engaged and the valve arrangement is de-energised immediately ceasing supply of gas to the burner, which causes the flame to extinguish.

Should the burner fail to light or is not detected during the trial for ignition period, the control means will go into lockout and the valve arrangement will turn off immediately. Recovery from the lockout requires the power source to be isolated for a period of five seconds.

As mentioned above, the microcontroller of the control means is programmed such that in the event that the established flame is lost while the burner is operating, the control means will respond within one second, or other pre-determined time, to de-energise the valve arrangement to the closed position preventing supply of gas. On reignition, the valve arrangement stays energised and the ignition system will be energised for a trial for ignition period to attempt to relight the burner. A common issue with BBQs particularly in windy conditions and on a low setting, flame may lift off the burner and extinguish, this allows the burner to relight in harsh environmental conditions. If the burner does not light the control means will de-energise the valve arrangement. The control means will go into lockout as noted above in "Failure to light". If the flame is re-established, normal operation resumes. The lockout will occur in if the relight is not successful (for example dirty burner, extreme weather conditions or interruption to the fuel supply).

In another preferred embodiment, once the system has been de-energised, it may attempt to relight the flame after a further period—say after 30 seconds. This may be attempted several times if the reason for the flame extinguishing is due to high winds, for example.

An advantage of the barbecue arrangement according to the present invention is that the unit can be safely lit, currently barbecues are lit manually where the customer turns on the gas and then introduces an ignition source, such as a flame (match/lighter) or a spark from a manual or electronic piezo device, this can result in an incident from elderly customers not being able to provide the ignition source in a timely manner therefore potentially getting burnt. The present invention increases the level of safety significantly as it fully automates the ignition process, which is when most unsafe incidents generally occur. The unique barbecue arrangement provides an overall safer and more user-friendly arrangement, which has the added advantage of being self-charging by way of the thermoelectric generator.

A further advantage of the barbecue arrangement of the present invention includes that other control interlocks can be easily and quickly installed and connected to the control means to improve the functionality and safety of the barbecue. An example of the types of additional devices that may be incorporated include thermostatic control (food temperature probes, barbecue hood temperature control) and other safety devices.

Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:

1. A barbecue arrangement, comprising:
   a barbecue body having a cooking surface, one or more burners positioned below the cooking surface, and one or more control knobs;
   a gas source adapted to supply a gas to the one or more burners, wherein the one or more control knobs are adapted to control the supply of the gas from the gas source;
   a flame detection assembly comprising:
      a power source;
      an ignition system, wherein the ignition system includes an on/off button in connection with the power source and an electrode ignition rod, wherein the electrode ignition rod is placed in a path of gas flow from the gas source;
      a flame sensor arrangement adapted to sense a flame within a flame location within the one or more burners;
      a microcontroller and a valve arrangement, wherein the microcontroller and the valve arrangement are in communication with the power source, the flame sensor arrangement and the ignition system;
   wherein the microcontroller and the valve arrangement are adapted to cause the valve arrangement to close and prevent supply of the gas flow when the ignition system is in an on position and no flame is detected; and
   a flame rollout cut off switch in communication with the microcontroller and the valve arrangement, which is adapted to cause the valve arrangement to close and prevent supply of the gas flow when the ignition system is in an on position and a flame is detected outside the barbecue body.

2. The barbecue arrangement according to claim 1, wherein the valve arrangement includes one or more solenoid valves, wherein the one or more solenoid valves are open when energised by the power source and the one or more solenoid valves are closed when de-energised.

3. The barbecue arrangement according to claim 1, wherein the flame detection assembly includes a flame sensing rod positioned such that an end portion of the flame sensing rod is positionable within the flame location in the one or more burners where a flame is intended to burn.

4. The barbecue arrangement according to claim 1, wherein the microcontroller and the valve arrangement are further adapted to ignite a flame within the flame location when the ignition system is in the on position prior to ceasing supply of the gas flow when no flame is detected in the flame location.

5. The barbecue arrangement according to claim 1, wherein the microcontroller and the valve arrangement are adapted to cease supply of the gas flow within one second when no flame is detected.

6. The barbecue arrangement according to claim 1, wherein the flame detection assembly further includes a housing unit, wherein the housing unit contains the microcontroller, and the valve arrangement of the microcontroller and the valve arrangement.

7. The barbecue arrangement according to claim 1, wherein the barbecue body includes a lower body and a grill hood, wherein the lower body houses the cooking surface and the one or more burners.

8. The barbecue arrangement according to claim 1, wherein the flame rollout cut off switch includes a temperature dependent resistor mounted to an outside of the barbecue body, wherein the temperature dependent resistor is adapted to cease a signal to the microcontroller and the valve arrangement when a flame temperature is reached.

* * * * *